Patented Dec. 27, 1927.

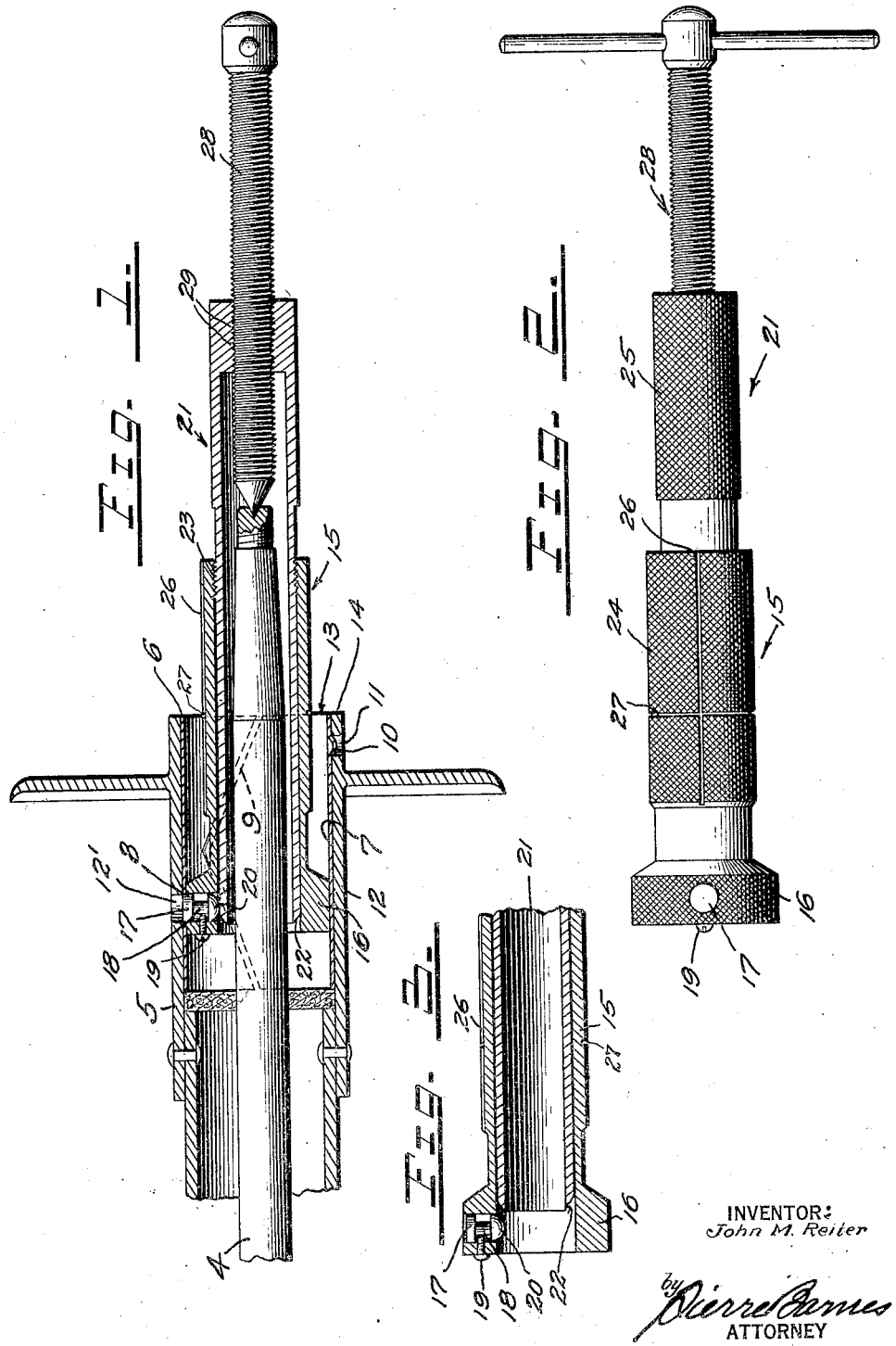

UNITED STATES PATENT OFFICE.

JOHN M. REITER, OF AUBURN, WASHINGTON, ASSIGNOR OF ONE-THIRD TO PIERRE BARNES, OF SEATTLE, WASHINGTON.

ROLLER-BEARING-SLEEVE EXTRACTOR.

Application filed March 5, 1927. Serial No. 172,976.

This invention relates to an improvement for extracting from a vehicle axle housing, a sleeve surrounding a roller bearing assembly.

The object of the invention is to provide a simple, efficient and conveniently operated implement for effecting the removal of a sleeve in a most rapid manner and without injuring the same.

More specific objects and advantages of the invention will appear in the following description.

The invention consists in the mechanism illustrated in the accompanying drawing, in which,—

Figure 1 is a vertical longitudinal sectional view of an implement embodying my invention shown applied. Fig. 2 is a plan view of the implement; and Fig. 3 is a vertical longitudinal sectional view of the left hand portion of Fig. 2.

In said drawing the reference numeral 4 represents an axle extending through a housing 5 which has at its outer end a cylindrical cavity 6, for a sleeve 7 which constitutes the outer member of a roller bearing assembly (not shown) for said axle. Adjacent its inner end and at the top of its peripheral wall the sleeve 7 is provided with a hole 8 which registers with a hole 12¹ in the housing, through which holes a lubricant is supplied to the bearing assembly above referred to.

Said sleeve is of the contractile type— that is to say, the sleeve is formed to have an external diameter slightly greater than the diameter of said cavity and is provided in its periphery with a slot 9 extending longitudinally its entire length, thereby permitting the sleeve to be contracted for inserting the same within the housing cavity. Said sleeve is held in place within said cavity because of its tendency to assume its normal size diametrically, and also by the provision upon the sleeve of a protuberance 10 which engages in an aperture 11 provided in the peripheral wall 12 of the cavity 6.

In practice, the outer end 13 of said sleeve is located in a vertical plane either within said cavity or coextensive with the extremity 14 of the housing wall 12, thus affording no projecting portion of the sleeve which can be grasped by an extracting tool.

In carrying out the invention, I provide a tubular casing member 15 having at one end a cylindrical head 16 of a diameter to provide a slidable fit within the sleeve. Said head is provided with a radially disposed bore for a cylindrical stud 17 having a peripheral groove 18 into which extends the end of a retainer screw 19. The width of the groove 18 is such as will permit axial movement of the stud sufficient to enable its being thrust outwardly from its sheathed position (Fig. 3) within the head 16 into the oil hole 8 of the sleeve when the latter is to be coupled with said casing member.

Being located in the upper portion of the casing head the stud 17 is normally held by gravitation in the sheathed position in which it is illustrated in Fig. 3, and when thus disposed the lower end 20 of the stud extends into the bore of said casing.

Extending axially into said casing bore is a tubular member 21, hereinafter termed the "controller".

Within the casing, the controller is provided with a tapering external surface 22 which, in an advancing movement of the controller, functions as a cam to cause the stud to be protruded from the outer periphery of the casing member.

The controller is advanced or retracted axially of the casing member by means of internal screw threads upon the latter coacting with external screw threads 23 upon the controller which screw threads are rendered operable by turning the controller in one or the other rotary direction.

To permit the two aforesaid members to be firmly grasped in the hands of the operator, portions 24 and 25 of the outer peripheral surfaces of the casing and controller are desirably knurled.

26 is a scratch mark or groove disposed longitudinally of the casing member and in a vertical plane with the axis of the stud 17; and 27 is a scratch mark or groove extending circumferentially about the casing and indicates with respect to the end 13 of the sleeve the extent of the insertion of the casing in the sleeve to position the stud in engageable relation with oil hole 8 of the sleeve.

To apply the device so far described, the casing and controller members arranged as shown in Fig. 3, are inserted within the sleeve and, after positioning the casing member by means of the scratch marks 26 and 27, the controller is rotated to advance the same through the medium of its threaded engagement with the casing whereby the tapering end of the controller causes the stud to be pushed into the hole 8 of the sleeve and thus couple the casing with the sleeve.

Thus united the sleeve may be extracted from the housing by withdrawing the casing. As illustrated, the sleeve and casing are together withdrawn from the housing by means of a manually operated screw 28 engaging in screw threads 29 of the controller and acting against the end of the axle, which is provided with a center-punch hole to receive the pointed end of said screw.

What I claim, is,—

1. An implement for removing a roller-bearing sleeve from the housing of an axle, comprising two tubular members, one of said members extending into the other member and connected thereto for axial adjustment, said inner member being provided with internal screw threads, a sleeve engaging stud mounted for movement radially of the outer member in the peripheral wall of the latter, means provided upon said inner member and engageable with said stud for protruding the same from the outer member, and a screw extending axially into said inner member and engaging the screw threads thereof for the purpose hereinbefore described.

2. In an implement for removing an apertured roller-bearing sleeve from an axle-housing, a tubular casing member, a stud mounted therein for limited movement radially of said member, and a tubular controller extending into said member and connected thereto by screw threads for relative axial movements, said controller being formed with a tapering portion and rendered operative by an axial movement of the controller to protrude the stud from the casing member into the aperture of said sleeve to couple the latter with said casing member.

3. In an implement for removing a roller-bearing sleeve from the housing of an axle, said sleeve having an aperture in its periphery, a tubular casing member adapted to be inserted within said sleeve, a stud mounted in said member for movement radially thereof into the sleeve aperture, said stud being normally retained by gravitation in disengaged relation with said sleeve, a controller member extending into the casing member and having a tapering end, said controller being movable axially of the casing member to cause said tapering end to effect a sleeve-engaging movement to the stud, and means acting through the medium of both of said members and with respect to the axle for the purpose of withdrawing the sleeve from the axle housing.

Signed at Auburn, Washington, this 29th day of Jan., 1927.

JOHN M. REITER.